J. L. PARKES.
PIPE CONNECTOR.
APPLICATION FILED NOV. 4, 1912.
1,135,135.
Patented Apr. 13, 1915.
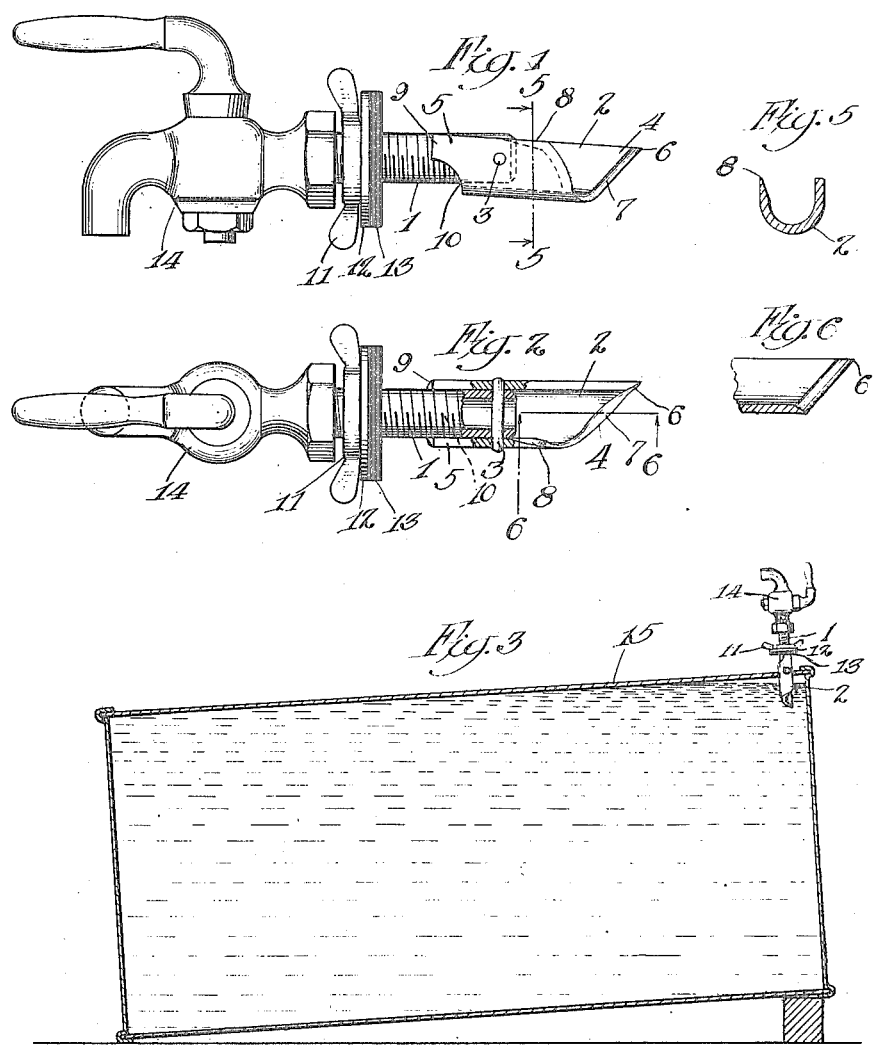
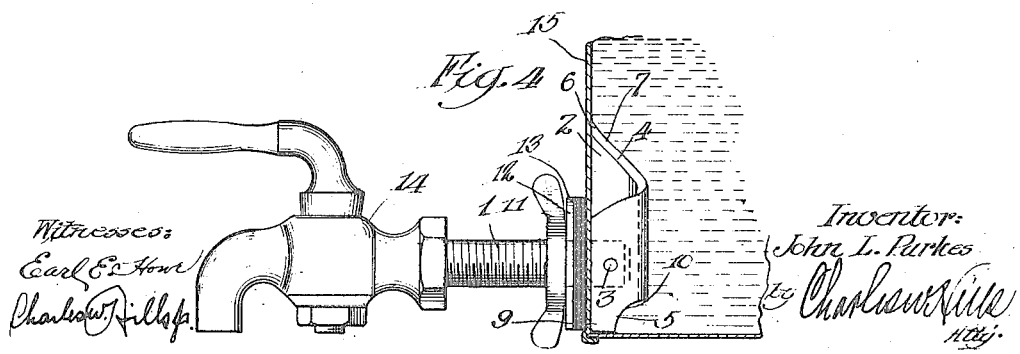
Witnesses:
Earl E. Howe
Charles W. Fills Jr.
Inventor:
John L. Parkes
by Charles W. Ville
Atty.

UNITED STATES PATENT OFFICE.

JOHN L. PARKES, OF CHICAGO, ILLINOIS, ASSIGNOR OF ONE-HALF TO ALBERT C. BROWN, OF CHICAGO, ILLINOIS.

PIPE-CONNECTOR.

1,135,135.   Specification of Letters Patent.   Patented Apr. 13, 1915.

Application filed November 4, 1912. Serial No. 729,193.

*To all whom it may concern:*

Be it known that I, JOHN L. PARKES, a citizen of the United States, and a resident of the city of Chicago, in the county of Cook and State of Illinois, have invented certain new and useful Improvements in Pipe-Connectors; and I do hereby declare that the following is a full, clear, and exact description of the same, reference being had to the accompanying drawings, and to the numbers of reference marked thereon, which form a part of this specification.

My invention relates to improvements in pipe connectors and has a particular reference to connectors for use with sheet metal receptacles.

It is an object of my invention to provide a pipe connection which can be easily and quickly connected to a sheet metal receptacle.

It is also an object of my invention to provide a pipe connection which can be conveniently used to make the necessary hole in the wall of the receptacle when applying the device thereto.

It is also an important object of my invention to provide a combined faucet and pipe connector for convenient attachment to a closed receptacle without the necessity of removing any of the contents of the tank.

It is a further object of my invention to provide a pipe connector which combines within one structure, all of the elements necessary for preparing a sheet metal receptacle for the insertion of the connector and for the securing of the connector in place, upon and in the wall of the receptacle.

My invention consists in a pipe connection comprising a pipe nipple having a crossbar pivotally mounted at one of its ends, said crossbar being formed and adapted to be used as a convenient means for perforating a sheet metal receptacle and being also adapted to serve as a clamping bar to prevent the withdrawal of the nipple from the wall of the receptacle.

My invention further consists in the association and combination of elements which provide a device by means of which the above and other objects are attained and all as hereinafter described and particularly pointed out in the claims.

The invention relates to the matters hereinafter described and more fully pointed out and defined in the appended claims.

In the drawings: Figure 1 is a side elevation of a combined faucet and pipe connection embodying my invention. Fig. 2 is a top plan view of the device shown in Fig. 1, certain parts being broken away to more clearly show the manner of mounting the crossbar. Fig. 3 is a section of a sheet metal receptacle, and illustrates the application of the device embodying my invention, thereto. Fig. 4 is a side elevation of the combined faucet and pipe connection shown in position for use on a receptacle. Fig. 5 is a detailed cross section taken on line 5—5 of Fig. 1. Fig. 6 is a detailed longitudinal section taken on line 6—6 of Fig. 2.

As shown in the drawings: 1, represents a threaded pipe nipple, open at both ends and having a U shaped pivotally mounted cross bar 2, upon the outer end of the same by means of a transverse pivot 3. The trough afforded by said U shaped cross bar 2, is of such width that it can receive the outer end of the nipple 1, between the side walls of the same without binding the nipple in the least. The outer side 4, of the cross bar is somewhat longer than the opposite side 5, thereof, and is provided with a relatively sharp point 6, and the slanting edge 7 thereof is beveled so that the outer or projecting side 4, affords a sharp cutting edge.

As shown in Figs. 1 and 2, the cross bar 2, is adapted to be arranged longitudinally or substantially parallel with the nipple, and when in this position, the sharp beveled side 4, is adapted to be used to drill a hole through the wall of a sheet metal (or other) receptacle.

The U shaped trough or cross bar 2, is cut on a diagonal line as clearly shown in Fig. 2, and one edge of the same is considerably shortened, and as shown a portion 8, of said shortened edge which projects beyond the end of the nipple is beveled from the inner side of the trough to afford a relatively sharp edge adapted to smooth the rough edges of the metal surrounding the hole in the wall of the sheet metal receptacle, through which it is desired to insert the nipple. The shorter or inner side 5 of the cross bar is partly cut away to afford a plurality of projecting ends 9 at the opposite sides of the trough or cross bar 2, and afford an opening 10, between the same adapted to admit the fluid or other content of the receptacle to the nipple from the lower end of the receptacle when the device is in use, as illustrated in Fig. 4. A wing nut 11, is threaded on the nipple 1, and a metallic or other suitable washer 12, provided with a suitable packing washer 13, is engaged on said nipple in such a manner that the same may be either engaged firmly against the outer ends 9 of the pivoted cross bar to hold the same in longitudinal position while being used as a drill or perforating tool or may be used to clamp the device in position after the hole has been made and thus effectively seal the same to prevent leakage at the point of connection.

When the device is used as a drill or perforating instrument the washer 13, is forced into contact with the ends 9, of the cross bar by means of the nut 11, as illustrated in Fig. 3, and prevents the cross bar from swinging out of its position while being thus used. The outer end of the nipple, as shown in this instance, is provided with a faucet or stop cock 14, and when the device is used as a drill or perforating instrument serves the purpose of a handle by means of which the device can be rotated to cut a hole or opening through the wall of the receptacle.

The device is illustrated as applied to a closed sheet metal receptacle 15, which is substantially full of liquid. Usually it is desirable to attach the device quite close to one end of a receptacle, and when doing so, the receptacle is raised at that end, as shown in Fig. 3, to carry the liquid away from the point at which the device is to be connected. It will be clearly understood from Fig. 3 that the longer side 4 of the cross bar, when held in longitudinal alinement with the nipple, can be forced through the wall of a receptacle so that the end of the nipple will come into contact with the said wall, the device is then rotated on its longitudinal axis, and the sharp knife edge 8, cuts from the wall of the vessel, the portion of the wall which has been cut as the sharp end of the cross bar has been forced through it. The nut 11, is then backed away from the cross bar and the nipple inserted farther into the receptacle sufficient to permit the cross bar to be turned on the pivot 3 to a right-angle position, and the device is then tightly sealed into the receptacle by clamping the packing washer 13 against the outer surface of the receptacle by means of nut 11 and washer 12, the cross bar 2 serving to resist the action of the nut and rigidly retain the device in position.

It is obvious that the device embodying my invention is peculiarly adapted to protect the users of liquid goods which are shipped in sheet metal or other receptacles from deception for the reason that such goods can be conveniently shipped in hermetically sealed receptacles which are not provided with any means of withdrawing the liquid therefrom. When it is desired to draw the liquid from the receptacle my combined pipe, nipple and faucet can be readily inserted, and conversely when the receptacle is empty it can be as readily removed therefrom.

It is obvious that my invention relates primarily to the provision of means for connecting a pipe to a plate or receptacle, and while I have chosen to illustrate the device in combination with a faucet, it will at once be understood that although the association of the device with a faucet carries with it certain inherent advantages, nevertheless, my invention is not limited to this specific application.

It will now be understood that the faucet serves the function both of a cross bar handle, while the device is used as a drill or perforation tool and convenient valve to close the nipple after it has been placed in position. It is, however, not essential that the cross bar handle shall also serve the function of a faucet, and as many modifications of my invention will readily suggest themselves to one skilled in the art, I do not purpose limiting the patent issued upon this application for patent otherwise than necessitated by the prior art.

I claim as my invention:

1. In a device of the class described a faucet, a threaded nipple forming a part thereof, a pivot pin extending through the end of said nipple transversely thereof, and an insertible cross bar member of U-section engaged on said pivot pin normally coaxial with said nipple and acting after insertion through a container to swing transversely over the end of the nipple, acting when the nipple is drawn up to hold the same securely within the container.

2. In a device of the class described the combination with a faucet and threaded nipple thereof, of a nut and washer adjustable on said nipple, a pivot pin extending transversely through the end of said nipple, and a cross-bar member pivotally engaged thereon near its middle with said pivot pin extending through the sides of said cross bar member near the edges thereof, said cross bar member normally coaxial with said nipple and acting to swing transversely and at right angles thereto after insertion into a container to resist removal of the nipple as said nut is taken up.

3. In a device of the class described the combination with a faucet and threaded nipple forming a part thereof, of a nut and washer adjustable on said nipple, a cross bar member of U-section associated with said nipple and a pivot pin extending through the walls of said cross bar member near the upper edges thereof and through the end transversely of said nipple, whereby after insertion into a container said member swings transversely of said nipple extending at right angles thereto on each side thereof affording a passage for the fluid to the nipple at each end of the cross bar member.

4. In a device of the class described the combination with a faucet and threaded nipple forming a part thereof, of a pivot pin extending transversely through the end of said nipple, a cross bar member of U-section pivotally mounted on said pin, one side of said cross bar member at one end extending beyond the other and provided with a cutting edge, the sides of said cross bar member at the other end cut away to near the bottom of said member, and mechanism adjustable on said nipple to draw the same outwardly after insertion through the wall of a container to tighten the nipple in position with said cross bar member swung into a position transversely of the nipple and extending on each side thereof and held from movement by said pivot pin.

5. In a device of the class described a cross bar member of U-section adapted for connection on the nipple of a faucet, one end of said cross bar member cut away to form a helix, the edge thereof sharpened and terminating at a cutting point, the sides of the other end of said member recessed and the upper edge of the sides of said member substantially flat to afford a bearing surface.

6. In a device of the class described the combination with the threaded nipple of a faucet, of a cross bar member of U-section pivotally connected to the end of said nipple, a pivot pin extending through said cross bar member and nipple affording the connection therebetween, and acting when said member is swung into a position transversely of said nipple to space the same from the end thereof affording a channeled passage open at each end for the entrance of fluid through said nipple, one end of said member provided with a sharpened edge and cutting point and the other end having the side walls of said member recessed to near the bottom thereof, affording a free flow of fluid when the device is in a transverse position, the pivot pin being disposed near said recessed end of said cross bar member whereby the same when in a position with the open side thereof directed upwardly assumes a position axially alined with said nipple and said pin acting to hold said cross bar member from removal from the nipple.

7. In a device of the class described the combination with the threaded nipple of a faucet, of a cross bar member of U-section connected to the end of the nipple by a pin extending through the end of the nipple transversely thereof and through said cross bar member and spaced from the bottom of said cross bar member to afford a passage between the end of the nipple and the bottom of said member when the same is in transverse position.

8. In a device of the class described the combination with the threaded nipple of a faucet, of a U-shaped member pivotally connected and permanently associated therewith on the end thereof, a pivot pin affording the connection between said nipple and U-shaped member, said pin extending transversely through said nipple and through the side walls of said U-shaped member near the edges thereof acting when said member is swung transversely of said nipple to space the same outwardly from the end thereof, one end of said cross bar member provided with a cutting edge and point for puncturing and cutting a hole through the wall of a container when the member is co-axial with said nipple, and means for drawing the nipple outwardly through the walls of the container after insertion thereof and said U-shaped member and after the same is swung by gravity into a position transversely of said nipple, to prevent retraction thereof from the container.

9. The combination with a faucet, of a threaded nipple forming a part thereof, a nut adjustable on said nipple, a packing washer adapted to be moved on the nipple by said nut, a cross bar member normally co-axial with said nipple, a pivot pin extending through the end of said nipple and through said cross bar member affording a pivotal connection therebetween acting to positively retain said cross bar member associated with the nipple at all times, said cross bar member of U-section and provided at one of its ends with a cutting edge and a sharp point, permitting insertion thereof and said nipple through the wall of a container, said cross bar member then swinging by gravity into a position transversely over the end of said nipple, permitting the nipple to be drawn up by said nut, said washer sealing the aperture cut by said cross bar member and said cross bar member holding the nipple within the container thus affording a rigid sealed support for the faucet for draining the container of its contents.

In testimony whereof I have hereunto subscribed my name in the presence of two subscribing witnesses.

JOHN L. PARKES.

Witnesses:
CHARLES W. HILLS, Jr.,
GEORGE R. MOORE.